(12) United States Patent
Schoenberger et al.

(10) Patent No.: US 8,774,611 B2
(45) Date of Patent: Jul. 8, 2014

(54) HEATING DEVICE FOR THE TEMPERING OF PREFORMS

(75) Inventors: Wolfgang Schoenberger, Brennberg (DE); Simon Fischer, Regensburg (DE); Andreas Wutz, Roding (DE); Jochen Hirdina, Regensburg (DE); Christian Holzer, Schierling (DE)

(73) Assignee: Krones AG, Neutraubling (DE)

( * ) Notice: Subject to any disclaimer, the term of this patent is extended or adjusted under 35 U.S.C. 154(b) by 285 days.

(21) Appl. No.: 13/317,494

(22) Filed: Oct. 19, 2011

(65) Prior Publication Data

US 2012/0099846 A1    Apr. 26, 2012

(30) Foreign Application Priority Data

Oct. 22, 2010   (DE) ...................... 10 2010 049 136.5

(51) Int. Cl.
  *F27B 9/36*    (2006.01)
  *B29C 49/68*   (2006.01)
  *B29B 13/08*   (2006.01)

(52) U.S. Cl.
  USPC ........... 392/424; 219/388; 219/405; 219/411; 425/174.4; 264/481

(58) Field of Classification Search
  None
  See application file for complete search history.

(56) References Cited

U.S. PATENT DOCUMENTS

| 4,204,111 | A  | * | 5/1980  | Yonko ......................... 219/411 |
| 5,549,468 | A  | * | 8/1996  | Mitchell et al. ............... 425/526 |
| 6,005,223 | A  | * | 12/1999 | Ogihara ........................ 219/388 |
| 6,242,717 | B1 | * | 6/2001  | Sanderson .................... 219/405 |
| 6,361,301 | B1 | * | 3/2002  | Scaglotti et al. ........... 425/174.4 |
| 6,632,087 | B1 |   | 10/2003 | Armelling et al. |
| 6,720,566 | B2 | * | 4/2004  | Blandford ................. 250/504 R |
| 7,121,821 | B2 | * | 10/2006 | Pickel ........................ 425/174.4 |
| 2011/0260370 | A1 | * | 10/2011 | Lize ............................... 264/481 |
| 2011/0262116 | A1 | * | 10/2011 | Metzger et al. ............... 392/408 |
| 2012/0267357 | A1 | * | 10/2012 | Monteix ....................... 219/411 |

FOREIGN PATENT DOCUMENTS

| CN | 2233312       | 8/1996  |
| CN | 1399860       | 2/2003  |
| DE | 35 19 498 C2  | 12/1986 |
| DE | 197 24 621 A1 | 12/1998 |
| DE | 100 58 950 B4 | 4/2002  |
| DE | 100 51 641 A1 | 5/2002  |
| DE | 101 41 639 A1 | 3/2003  |
| DE | 101 45 650 A1 | 4/2003  |
| DE | 10 2004 005 917 A1 | 8/2005 |
| DE | 10 2007 031 771 A1 | 1/2009 |
| EP | 1 278 619 B1  | 5/2010  |

\* cited by examiner

*Primary Examiner* — Joseph M Pelham
(74) *Attorney, Agent, or Firm* — Davidson, Davidson & Kappel, LLC

(57) ABSTRACT

A heating device for tempering preforms before processing in a stretch blow device. The heating device includes a heating alley with a plurality of infra red emitters, arranged parallel to the longitudinal axis of the tempered preforms. At least one back reflector and/or one filter is assigned to the infra red emitters, whereby the at least one back reflector and/or the at least one filter is segmented.

8 Claims, 10 Drawing Sheets

Fig. 3 (prior art)

linear expansion coefficients α of some solid materials at 20°C

| name | α in 10-6 K-1 |
|---|---|
| aluminium, milled | 23.2 |
| aluminium, pure | 23 |
| alumina (aluminium oxide) | 6.7 |
| glass (window glass) | 7.6 |
| glass (instrument glass) | 4.5 |
| glass (BK7) | 7.1 |
| glass (borosilicate glass, duran glass, pyrex glass) | 3.25 |
| glass (quartz glass) | 0.5 |
| ceramic glass (zerodur) | <0.1 |
| gray cast iron | 0 |
| ferritic steel | 11 to 15 |
| austenitic steel | 22 to 25 |

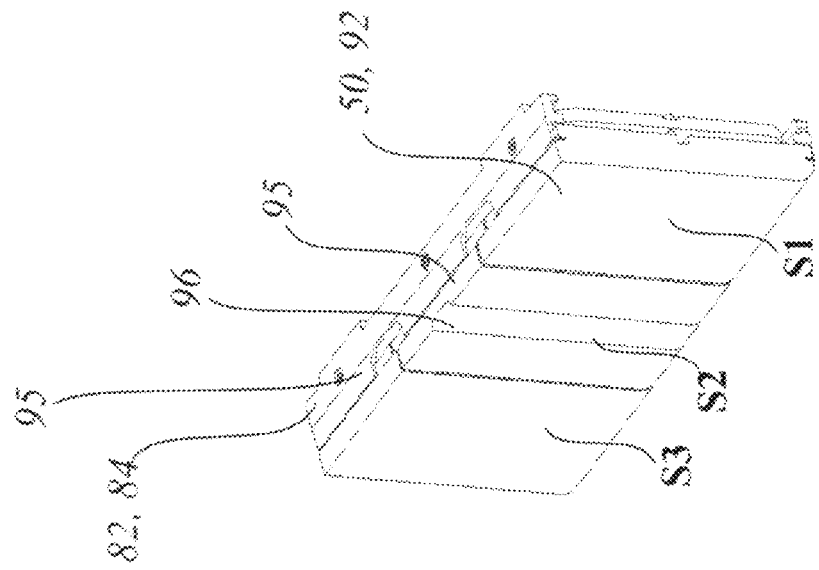
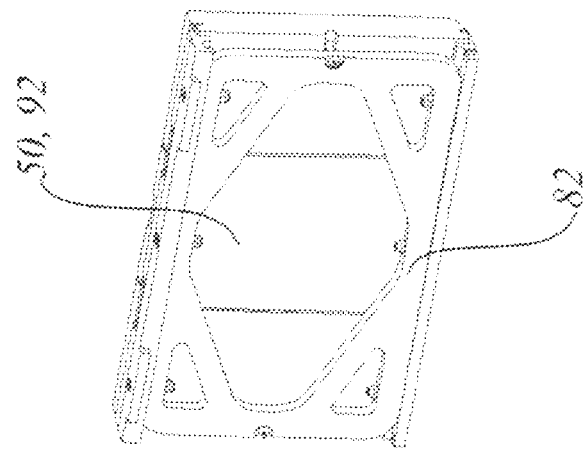

US 8,774,611 B2

HEATING DEVICE FOR THE TEMPERING OF PREFORMS

This claims the benefit of German Patent Application DE 10 2010 049 136.5, filed Oct. 22, 2010 and hereby incorporated by reference herein.

The present invention relates to a heating device for tempering preforms, especially a heating device. The invention furthermore relates to the use of a back reflector or a filter in a heating device for tempering preforms.

BACKGROUND

So called preforms are used for the production of plastic bottles. The preforms are made of a thermoplastic material, especially PET. The preforms are first heated and then reshaped into the desired container shape in a stretch blow device. Usually the preforms are conveyed through a heating device on a conveyor path before being processed in the stretch blow device.

Each preform is already designed with an upwardly open mouth region, which usually comprises an external thread. This mouth region essentially corresponds to the mouth region of the finished bottle. The preforms are typically injection molded parts. The preforms are tempered to the required forming temperature in a heating device. The tempered preforms are then processed and reshaped into the final container or bottle shape in a stretch blow device.

The heaters for tempering the preforms via infrared radiation are arranged in heating boxes. The heating boxes are arranged on the outboard side of the straight long sides of the heating device. Usually reflectors are arranged on the inside and on the floor part of the heating boxes. Thereby the emitted infrared radiation can be used as much as possible because the infrared radiation is advantageously deflected in the direction of the preforms.

In most known systems the mouth region of the preforms is protected from excessive heating by an air stream. This is necessary because otherwise the mouth region might be deformed in the subsequent blow molding process. This would lead to the production of incorrect containers that need to be discarded.

Furthermore, the surface of the preforms needs to be protected from burning which might occur due to excessive local heating. This is usually done by injecting air into the heating system. The air is usually injected through slits in the reflectors that are arranged opposite to the heating elements.

A schematic representation of a heating device 1 for tempering preforms 20 according to the known state of the art is shown in FIG. 1. The preforms 20 are delivered by transport means or transporter 2, then divided and spaced as required by a sawtooth starwheel 3a and fed into an oven or heating module 4, where they are moved along a heating tunnel 5 in a transport direction F.

While moving through the oven 4, the preforms 20 first pass through a first linear heating zone 5a, whereby their circumferential surface is heated uniformly. After a deflection zone 6 at one end of the oven 4, the movement of the preforms 20 continues through a second linear heating zone 5b. In the second linear heating zone 5b the preforms 20 are tempered to the final temperature before being processed into the final shape in a stretch blow molding device. Multiple heating boxes 7 are arranged in the linear zones 5a, 5b of the heating tunnel 5. The heating boxes 7 comprise infrared emitters and additional reflectors.

The reflectors are required in order to minimize radiation losses as much as possible. The radiation emitted by the infrared emitter, which does not enter the preforms 20, is reflected back to the preforms 20 by the reflectors and therefore not lost.

While the preforms 20 pass through the oven 4, they are preferably rotated to ensure a uniform heating of all sides. Then the heated preforms 20 are passed, for example, to an outlet starwheel 3b and fed into a stretch blow molding device or something alike.

FIG. 2 shows a heating box 7 known from prior art for use in a heating device according to FIG. 1. FIG. 2 especially shows a heating alley 8 with a heating box 7 used in one of the linear heating zones 5a, 5b in the heating module 4, 5 (see FIG. 1). The preform 20 is mounted on holding means or holder 16 and preferably rotated during its movement through the heating alley 8. To prevent excessive heating of the mouth region 22 of the preform 20, the mouth region 22 is shielded from direct radiation by a shielding plate 9. Furthermore an outer cooling plate 10 is arranged in this region. This outer cooling plate 10 shields the mouth region 22 from upward radiation.

In a heating alley 8 infrared emitters are arranged in a vertical row parallel to the longitudinal axis X of the preform 20. Therefore the preform 20 gets irradiated and heated over its entire height. The term parallel refers to a plane, in which the majority of the radiant emitters 11 are arranged. The longitudinal axis of each rod-shaped radiant emitter 11 is perpendicular to the longitudinal axis X of the preform 20. The electrical power of each radiant emitter 11 can be controlled separately. Thereby a temperature profile can be applied to the preform 20 along its longitudinal axis X. All radiant emitters 11 are arranged in the same distance from the longitudinal axis X of the preform 20. Furthermore, a bottom radiant emitter 12 is arranged in the lower part of the heating alley 8, which irradiates and thereby heats the preform 20 from below.

To ensure the best use of the radiation from the radiant emitters 11, 12, the heating alley 8 comprises reflectors, especially a counter reflector 13, a bottom reflector 14 and a back reflector 15. The counter reflector 13 is arranged behind the preform 20, opposite to the radiant emitters 11. The back reflector 15 is arranged behind the radiant emitters 11 thus reflecting the radiation that could otherwise not be used for the heating of the preforms 20.

It is necessary to have a certain minimal distance d1 between the back reflector 15 and the infrared radiant emitters 11 to prevent damage of the back reflector 15 due to the high temperature fluctuations in the heating alley 8.

EP1 278 619 B1 describes a heating assembly with elongated heaters. A single reflector is associated with each heater. The reflector has a parabolic shape, therefore the reflected radiation beams are generally parallel to each other which ensures a controlled tempering of the preforms.

DE 100 58 950 B4 shows a heating route for preforms with elongated halogen light sources. The reflectors are arranged around the preform and form a substantially closed radiation space.

SUMMARY OF THE INVENTION

Due to the high process temperatures and the temperature fluctuations occurring in the heating tunnel, the demand on the materials used in the heating tunnel is very high. For this reason reflector materials with advantageous properties regarding temperature resistance, thermal shock resistance, reflection of radiation, thermal conductivity and so on are preferably used. Especially ceramics and glass show very good properties. These materials are characterized by their low thermal expansion coefficients and low linear expansion coefficients. Therefore their temperature-dependent expansion is relatively low. By contrast, typical metallic materials exhibit a significantly higher thermal expansion coefficient and thus show a higher linear expansion. Examples of the linear expansion coefficients of various materials at 20° C. are listed in tabular form in FIG. 3.

With ever rising energy prices, the highest possible efficiency of machinery and equipment is becoming increasingly important. It is an object of the present invention to optimize the efficiency of heating tunnels or similar heating devices by using suitable reflectors.

The present invention provides a heating device for tempering preforms prior to processing in a stretch blow molding device. The used preforms comprise a mouth region and a longitudinal axis. The heating device comprises a heating alley with transport means or transporter for the movement of the preforms along a transport route. In the heating alley a plurality of infrared emitters are arranged in a vertical row parallel to the longitudinal axis of the preform. All the radiators have the same distance to the longitudinal axis of the irradiated preform. The infrared emitters are used for heating the preforms. To take full advantage of the radiation, at least one back reflector is associated with the infrared emitters. Any radiation that is emitted on the backside of the infrared emitters is reflected into the heating alley where it also serves to heat the preforms.

Furthermore at least one filter can be assigned to the infrared emitters, so that only radiation of a specific wavelength or a specific wavelength range is introduced or irradiated into the heating alley. This filter is preferably used for changing short-wave radiation emitted from the infrared emitters into long-wave radiation. Especially one filter can be assigned to each infrared emitter.

According to the invention the at least one back reflector and/or the at least one filter is formed in segments. Very strong temperature fluctuations occur in a heating alley. The infrared emitters produce temperatures of 800° C. or even more. Large back reflector tiles or filter tiles are usually made of a ceramic material, glass, glass ceramics, quartz glass, coated quartz glass or something alike. These materials are especially brittle. Therefore these materials tend to break easily when they are subjected to high temperature fluctuations and/or loads of pressure and/or tensile forces. The back reflector tiles or filter tiles then have to be replaced. This requires a stopping of the machinery and leads to a costly loss of production. Due to its segmented structure the at least one back reflector and/or the at least one filter can be arranged significantly closer to the infrared emitters without incurring damage, especially without the danger of breakage.

In particular, the individual segments of the at least one back reflector and/or the at least one filter are interconnected by a tongue and groove joint. The advantage of such a joint is that a controlled expansion takes place. Due to the form-locking connection between the tongues and grooves no gaps are formed between the segments of one tile. In the case of the reflector such gaps would lead to a loss of radiation. In case of the filter such gaps would allow the passage of radiation of an unwanted wavelength.

In general, the at least one back reflector and/or the at least one filter is arranged in the heating alley in a mounting bracket. Such a mounting bracket is made for example from sheet steel or stainless steel or stainless steel plate or a similar suitable material. The mounting bracket thus has a different linear expansion coefficient than the at least one back reflector and/or the at least one filter. With the temperature fluctuations occurring in the heating alley, this can cause pressure or strain on the at least one back reflector and/or the at least one filter. This can in turn result in exceeding the allowable material limits and lead to a breakage of the material of the reflector or filter tile.

Traditionally, the reflectors and/or filter are fastened firmly or rigidly to the metallic material of the mounting bracket by screw connections, bonding, clamping, folding or riveting joints or something alike. The metallic materials are used as fastening or support elements for the installation of the reflectors and/or filters in the heating alley. The different linear expansion of the different materials leads to additional or increased stress on the different components, especially on the reflector or filter tile. The materials glass or ceramic used as reflector material are brittle and can take up only little pressure or tensile stress. Repeated temperature fluctuations therefore quickly lead to damages of the reflector, for example, by breakage.

According to a preferred embodiment, the at least one back reflector and/or the at least one filter is arranged in a so-called floating mount or floating bearing. The floating mount is required for fastening the reflector within the heating alley. Hereby, the ceramic material of the back reflector and/or the filter is decoupled from the mounting element. The floating mount is used for providing fastening means for fastening the reflector within the heating alley. The floating mount prevents additional stresses on the brittle material of the at least one back reflector and/or the at least one filter. The floating mount allows a free movement or extension of the brittle material in all spatial directions.

At least one recess is incorporated in the narrow side faces of each reflector, whereby at least one holding element or structural element of a frame member of the floating mount engages with the recess. The recess is wider and/or deeper than the engaging frame member. Particularly the width of the recess is wide enough to ensure that always an air gap remains between the reflector material and the frame material, even though the reflector and the frame expand differently. Furthermore the recess is deeper than the engaging frame member. Therefore free movement of the material is also possible in this spatial direction. In this construction the reflector is supported in the frame with sufficient precision. Especially no additional stress arises from the use of different materials. This is due to sufficient space in all directions, which allows an unhindered expansion of the different materials.

Preferably, the at least one back reflector and/or the at least one filter—hereinafter referred to as tile—is held in a rigid, torsion-resistant frame. Such a frame is particularly useful for thermal decoupling between the tiles and the frame, since the middle of the frame is free of material. Therefore no expansion or deformation of the frame takes place in this middle area.

To make an infrared emitter, first a glass tube is produced. Then halogen gas is introduced into the glass tube through a hole that is closed afterwards. At this so-called injection point, the material thickness of the emitter is increased. To be able to place the back reflector as close as possible to the infrared emitter, the reflector shows an exposure or groove in the area corresponding to the injection point of the emitter. According to an alternative embodiment the back reflector is segmented in this area.

Due to the segmented structure the tile can stand up to larger temperature fluctuations. It is therefore possible to minimize the distance between the infrared emitters and the back reflector. Preferably, the maximum distance between the infrared emitters and the back reflector is 50 mm. Even more preferably the maximum distance between the infrared emitters and the back reflector is 10 mm or even as low as 5 mm.

Furthermore, at least one counter reflector is arranged in the described heating alley. The counter reflector is located on the side of the heating alley opposite to the infrared emitters. Therefore the preform is moved between the infrared emitters and the at least one counter reflector. Minimizing the distance between the preform and counter reflector also leads to a significant improvement in energy efficiency because the reflection of the radiation onto the preform is improved.

BRIEF DESCRIPTION OF THE DRAWINGS

In the following, embodiments of the invention illustrated by the accompanying figures are used to explain its advantages. The relative sizes of the individual elements in the corresponding figures are not always in real proportions. Some forms are simplified and other forms are enlarged in relation to other shown elements for the sake of clarity.

FIG. 3 shows the linear expansion coefficients of various materials at 20° C. in a tabular form (prior art) (prior art).

FIGS. 7a/b show a further embodiment of a mounting bracket for a back reflector.

DETAILED DESCRIPTION

Figure 1:
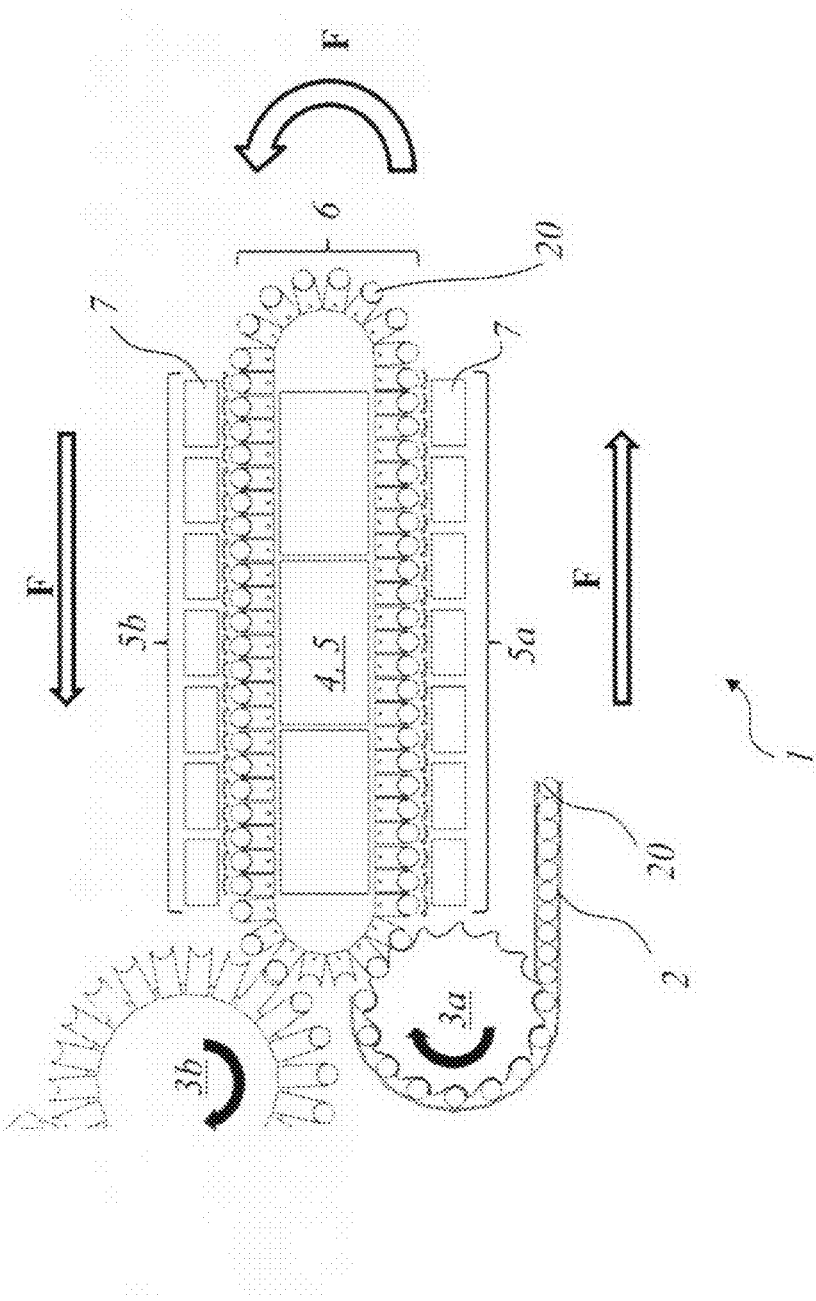
FIG. 1 shows a schematic representation of a heating device (prior art).
Figure 2:
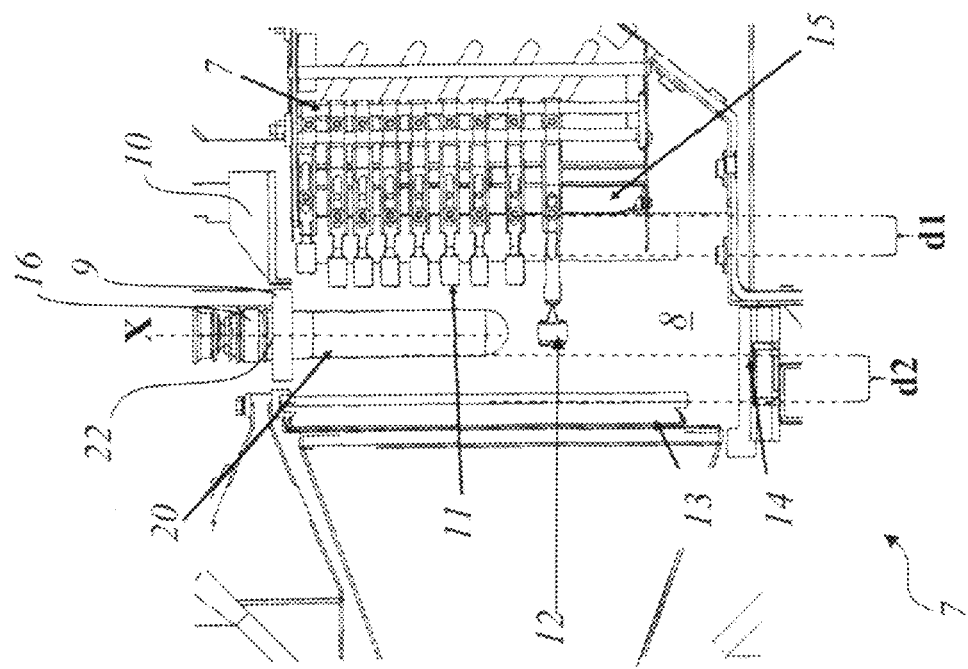
FIG. 2 shows a heating box that is used in a heating device according to FIG. 1 (prior art).

For the same or equivalent elements of the invention, identical reference numerals are used. Furthermore, for the sake of clarity, only reference numerals are represented in the various figures, which are necessary for the description of each figure. The illustrated embodiments are merely examples of how the inventive device can be designed and do not constitute final limitations.

Figure 4:
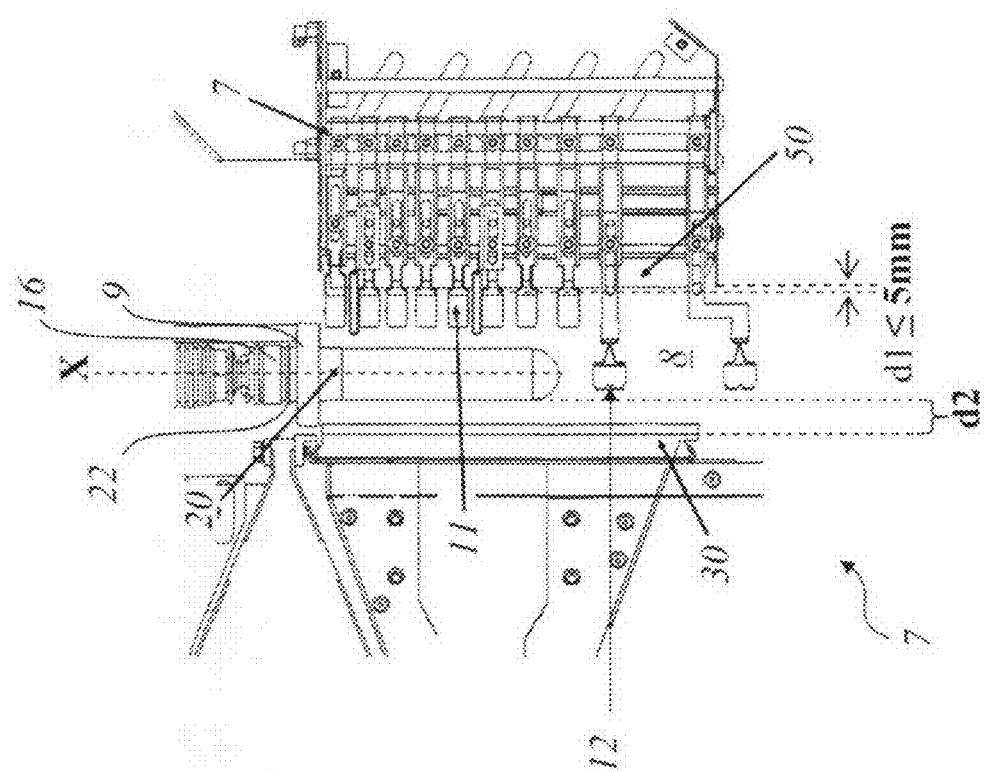
FIG. 4 shows a heating box that is used in a heating device according to the invention.

FIG. 4 shows a heating box 7 to be used in a heating device or heater according to the invention. According to the invention the back reflector 50 can be located in a very short distance d1 to the infrared emitters 11. Preferably, the distance d1 is a maximum of 5 mm. Furthermore, the distance d2 between the preform 20 and the counter reflector 30 is reduced, which also leads to a better use of the infrared radiation.

Figure 5B:
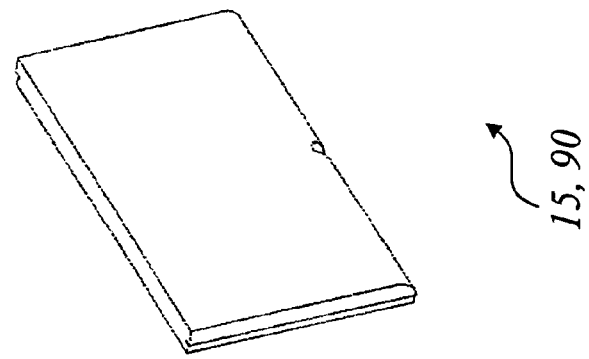
FIGS. 5a/b show a back reflector according to the prior art.
Figure 5A:
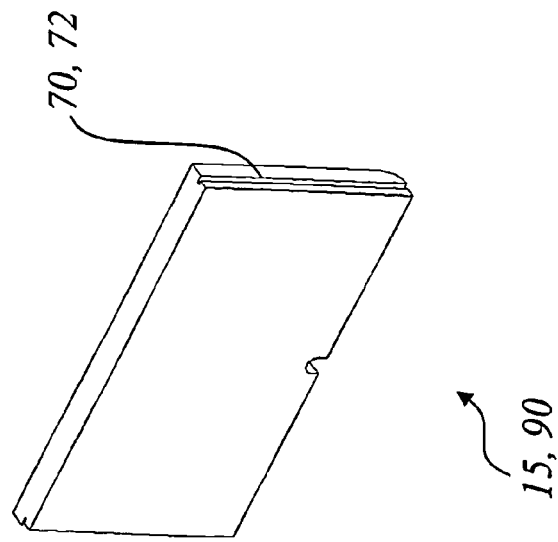

FIGS. 5a/5b show two different views of a back reflector 15 according to the known state of the art. This consists of a single tile 90, which is for example made of ceramic material, glass, glass ceramics, quartz glass, coated quartz glass, polished sheet aluminum or any other suitable material. The back reflector 15 preferably has mounting devices 70 for facilitating the mounting and replacing of the back reflector 15 in the heating alley. This may for example be a notch or groove 72. The back reflector 15 may then be inserted into corresponding mounting devices in the heating alley.

Figure 6B:
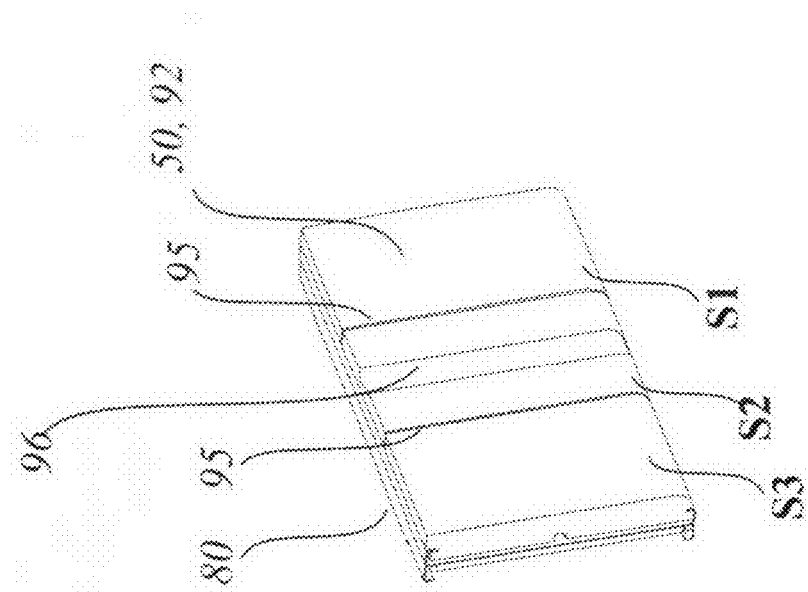
FIGS. 6a/b show a back reflector according to the invention with a mounting bracket.
Figure 6A:
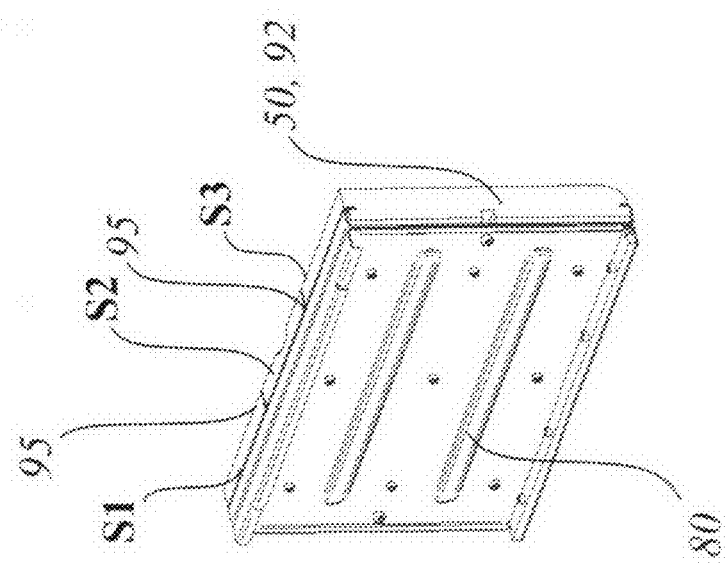

FIGS. 6a/6b show a back reflector 50 or a tile 92 according to the present invention in a mounting bracket 80. The tile 92 is divided into three segments S1, S2, S3. The segments S1, S2, S3 are connected to each other via interlocking tongue and groove joints 95. A controlled expansion takes place when the tile 92 is heated. Due to the connection by interlocking tongue and groove joints no gaps occur between the segments S1, S2, S3 of the tile 92, which might lead—in the case of the back reflector 50—to a loss of radiation. In the case of the filter such gaps would lead to the passage of radiation of unwanted wavelength.

A mounting bracket 80 particularly serves to facilitate the mounting and the replacement of the tile 92 in the heating alley. For this reason the mounting bracket 80 may, for example, be provided with mounting devices.

Furthermore, the tile 92 features a recess 96. The position of the recess 96 is selected in a way that after installation of the tile 92 in a heating alley the recessed area 96 corresponds to the injection point of the infrared emitter. It is therefore possible to place the back reflector 50 very close to the infrared emitter.

FIGS. 7a/7b show a further embodiment of a mounting bracket 82 for a back reflector 50. The design of the tile 92 corresponds to the tile 92 in FIGS. 5a/b.

The mounting bracket 82 is made of e.g. a steel sheet, stainless steel sheet or a similar suitable material. The mounting bracket 82 is designed as a so-called floating mount. The floating mount 82 prevents additional tension on the brittle material of the tile 92 and allows a free movement and extension of the tile 92 in all spatial directions.

The mounting bracket 82 is preferably designed as a rigid, torsion-resistant frame 84. The frame 84 particularly serves for thermally decoupling the tile 92 from the frame 84. Since the middle of the frame 84 is free of material, no expansion or deformation can take place in this middle part. Therefore no strain or pressure is applied to the tile 92.

Figure 8B:
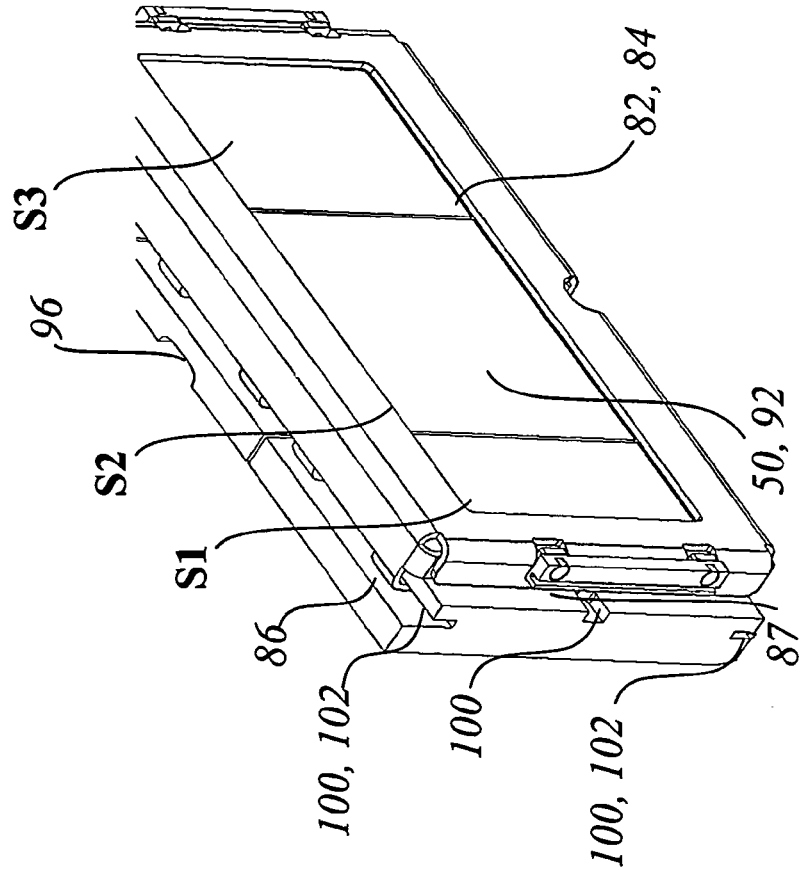
FIGS. 8a/b show a further embodiment of a back reflector in a floating mount according to the invention.
Figure 8A:
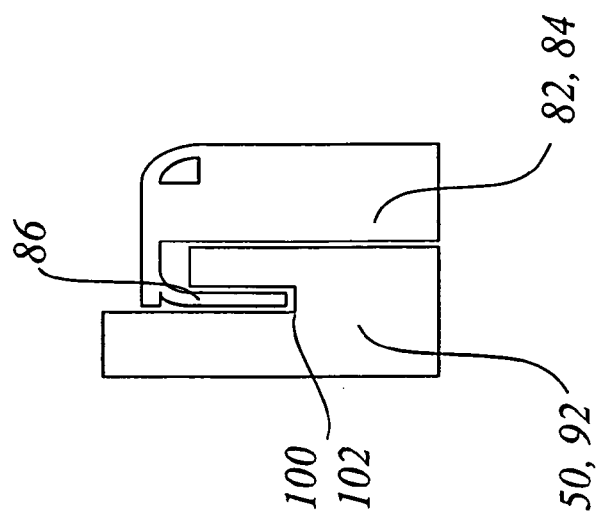

FIGS. 8a/8b show further views of a back reflector 50 according to the invention. The back reflector 50 is arranged in a floating mount 82. A recess 100, particularly a slot 102 or something alike, is incorporated in the reflector 50. At least one holding element 86, 87 engages with the mount 82. Preferentially all four narrow sides of the reflector 50 show corresponding recesses 100, 102, so that the reflector 50 can be supported by the frame 84 of the mount 82 on all four sides.

The dimension of the recesses 100 is specifically chosen to ensure that always a gap remains between the reflector 50 and the mount 82, even when they expand differently. Thus there is no or only a slight contact between the reflector 50 and the mount 82.

The reflector 50 is held in the support frame 84 of the mount 82 with sufficient accuracy. But still sufficient space is available in all three spatial directions for material changes, especially for expansions. This construction reliably prevents the development of additional tension on the reflector 50.

Figure 9A:
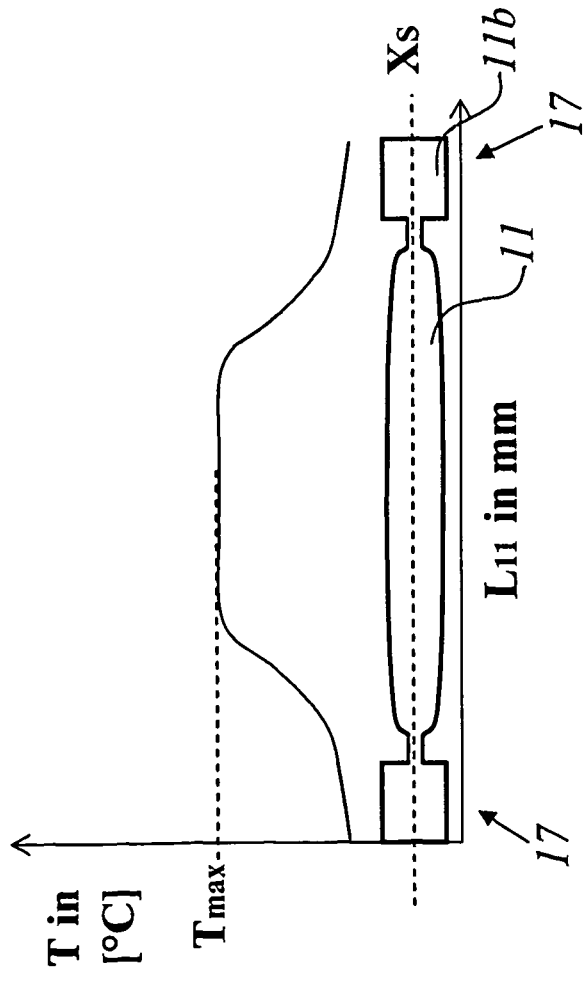
FIGS. 9a/b show the temperature distribution on a reflector along the longitudinal axis of the reflector, whereby the reflector is arranged behind the emitter (prior art).
Figure 9B:
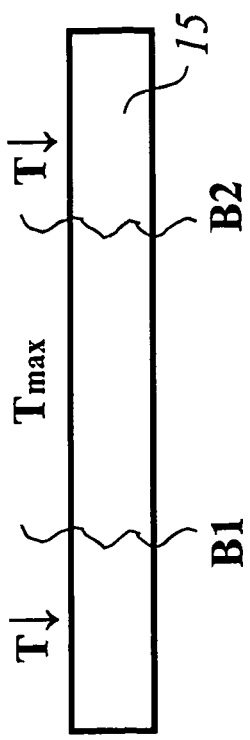

FIGS. 9a/9b show the temperature distribution in a heating alley along the longitudinal axis XS of an emitter and along a reflector arranged behind the emitter according to the prior art. The temperature profile is uneven over the length L11 of the emitter 11. The length L11 of the emitter 11 is measured and shown in mm. No heating coil is incorporated into the ends 11b of the emitter 11. Additionally the ends 11b of the emitter 11 are supplied with cooling air 17 to increase the lifetime of the emitter 11. This results in a maximum temperature Tmax in the middle part of the emitter 11. The temperature decreases towards the ends 11b of the emitter 11. The reflector 15 that is arranged behind the emitter 11 especially tends to break in the areas B1, B2 of the temperature increase or decrease.

Figure 10:
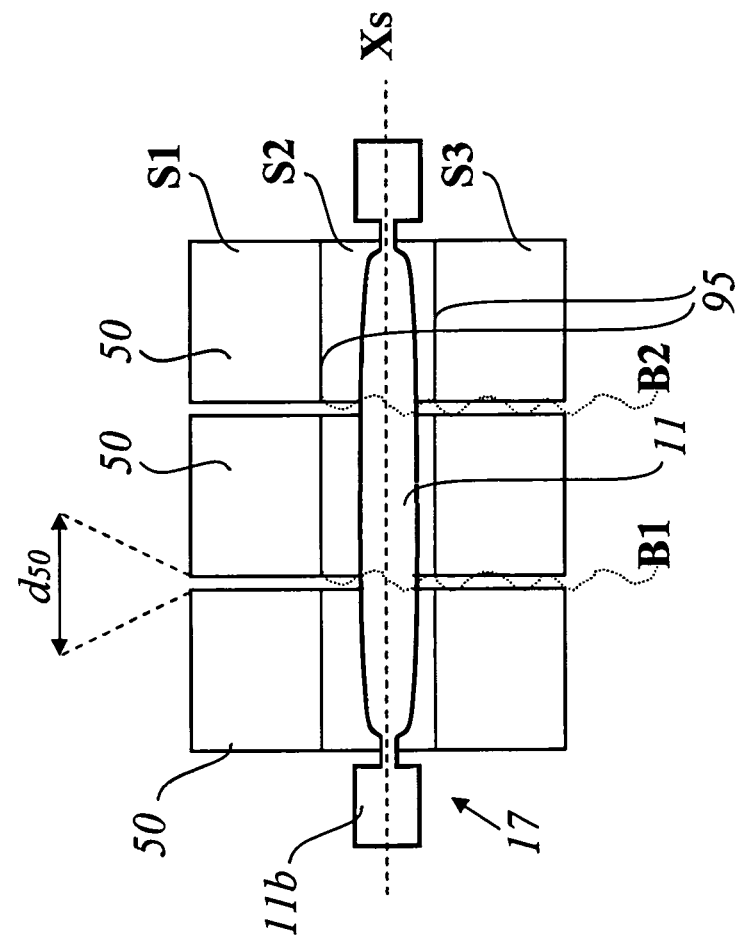
FIG. 10 shows an arrangement of several reflectors behind an emitter according to the invention.

FIG. 10 shows an advantageous arrangement of several reflectors 50 according to the invention behind an emitter 11. Hereby the reflectors 50 are arranged parallel to each other, whereby the segments S1, S2, S3 of each reflector 50 are arranged perpendicular, e.g. one above the other. The size of the reflectors 50 is especially selected. In the areas with increased susceptibility to breakage, the adjacent reflectors are arranged at a small distance d50 from each other.

This so-called vertical positioning of the reflectors 50 in comparison to the emitter longitudinal axis XS is particularly advantageous. The development of additional internal stress over long lengths of the ceramic or glass material of the reflectors 50—which usually arises due to large temperature differences—can be avoided with this additional segmentation, which is accomplished by the arrangement of several reflectors beside each other.

The invention has been described with reference to preferred embodiments. However, it is conceivable to one skilled in the art that variations or modifications of the invention can be made without departing from the scope of the following claims.

| List of reference numbers: | |
|---|---|
| 1 | heating device |
| 2 | transport means |
| 3a | sawtooth starwheel/infeed starwheel |
| 3b | outlet starwheel |
| 4 | heating module/oven |
| 5 | heating tunnel |
| 5a/5b | linear heating zone |
| 6 | deflection zone |
| 7 | heating box |
| 8 | heating alley |
| 9 | shielding plate |
| 10 | cooling plate |
| 11 | infra red emitter |
| 11b | emitter end |
| 12 | bottom emitter |
| 13 | counter reflector |
| 14 | bottom reflector |
| 15 | back reflector |
| 16 | holding means |
| 17 | cooling air |
| 20 | preform |
| 22 | mouth region |
| 30 | counter reflector |
| 50 | back reflector |
| 70 | mounting device |
| 72 | notch/groove |
| 80 | mounting bracket |
| 82 | mounting bracket/floating mount |
| 84 | frame |
| 86 | holding element |
| 87 | holding element |
| 90 | tile |
| 92 | tile |
| 95 | tongue and groove joint |
| 96 | recess |
| 100 | recess |
| 102 | slot |
| B1/B2 | breakage sites |
| d1 | distance between infrared emitters and back reflector |
| d2 | distance between preform and counter reflector |
| d50 | distance between two reflectors |

-continued

| List of reference numbers: | |
|---|---|
| S1, S2, S3 | segments |
| X | longitudinal axis |
| XS | emitter longitudinal axis |
| F | transport direction |

What is claimed is:

1. A heating device for tempering preforms before processing in a stretch blow device, the preforms each comprising a mouth region and a longitudinal axis, the heating device comprising:
   a heating alley with a transporter for movement of the preforms along a transport route, a plurality of infra red emitters arranged in the heating alley; and
   at least one back reflector and/or at least one filter adjacent to the infra red emitters, the at least one back reflector and/or the at least one filter being segmented;
   wherein the heating device includes at least one back reflector, and the at least one back reflector has a furrow or groove in a section corresponding to an injection point of at least one of the infra red emitters.

2. The heating device as recited in claim 1 wherein individual segments of the at least one back reflector and/or the at least one filter are connected by a tongue and groove joint.

3. The heating device as recited in claim 1 further comprising a floating mount supporting the at least one back reflector and/or the at least one filter.

4. The heating device as recited in claim 1 further comprising a rigid, torsion-resistant frame retaining the at least one back reflector and/or the at least one filter.

5. The heating device as recited in claim 1 wherein the at least one back reflector is made of a ceramic material, a glass ceramics or a coated quartz glass and/or the at least one filter is made of a coated quartz glass.

6. The heating device as recited in claim 1 further comprising at least one counter reflector arranged on a side of the heating alley opposite to the infra red emitters, the preform moving between the infra red emitters and the at least one counter reflector, a maximum distance between the infra red emitters and the at least one back reflector and/or a further distance between the infra red emitters and the at least one counter reflector being 50 mm.

7. The heating device as recited in claim 1 wherein the heating device includes the at least one back reflector and a maximum distance between the infra red emitters and the at least one back reflector is 5 mm.

8. A back reflector or filter for a heating device for tempering preforms before processing in a stretch blow device, the preforms each comprising a mouth region and a longitudinal axis, the heating device comprising a heating alley with a transporter for movement of the preforms along a transport route, a plurality of infra red emitters arranged in the heating alley, the back reflector or the filter being assigned to at least one infra red emitter, the back reflector or the filter comprising a plurality of segments so as to be segmented, wherein the back reflector has a furrow or groove in a section corresponding to an injection point of at least one of the infrared emitters.

* * * * *